Feb. 20, 1923.
H. S. WATERMAN
PISTON RING
Filed Jan. 19, 1921
1,446,076
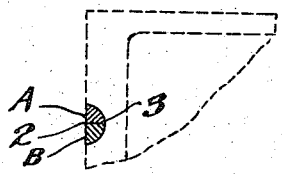
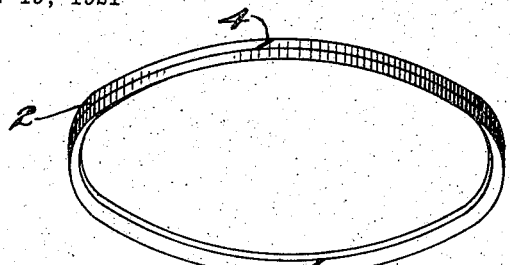
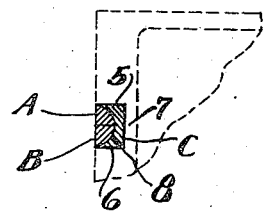
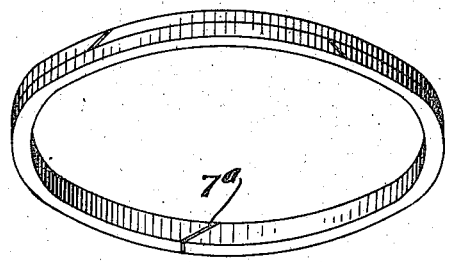
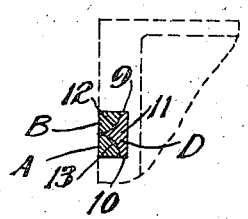
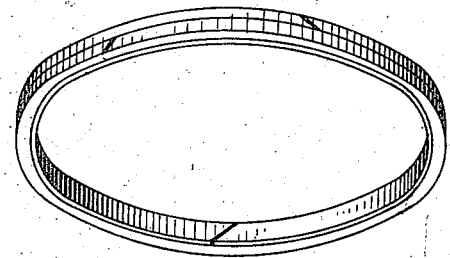
Inventor
HARRY S. WATERMAN
By Chas. E. Townsend
Atty.

Patented Feb. 20, 1923.

1,446,076

UNITED STATES PATENT OFFICE.

HARRY S. WATERMAN, OF SAN FRANCISCO, CALIFORNIA.

PISTON RING.

Application filed January 19, 1921. Serial No. 438,352.

*To all whom it may concern:*

Be it known that I, HARRY S. WATERMAN, a citizen of the United States, residing at the city and county of San Francisco and State of California, have invented new and useful Improvements in Piston Rings, of which the following is a specification.

This invention relates to a piston ring, and especially to that type known as sectional or leak-proof rings.

One of the objects of the present invention is to provide an improved and simplified piston ring of the sectional leak-proof type, and especially a ring which will not only maintain a snug fit with the cylinder wall, but also with relation to the grooves formed in the piston for the reception of the rings.

Another object of the invention is to provide a base ring which will permit practically any standard form of piston in use today to be fitted with a type of ring forming one of the features of the present invention.

Further objects will hereinafter appear.

The invention consists of the parts and the construction, combination and arrangement of parts as hereinafter more fully described and claimed, having reference to the accompanying drawings, in which—

Fig. 1 is a sectional view showing one form of the piston ring.

Fig. 2 is a perspective view of the same.

Fig. 3 shows another form of the piston ring.

Fig. 4 is a perspective view of the same.

Fig. 5 shows still another form of the piston ring.

Fig. 6 is a perspective view of the same.

Referring to the drawings in detail, and particularly to Figs. 1 and 2, A and B indicate a pair of superposed annular piston rings which are so formed as to present a cylindrical exterior surface 2, adapted to engage the inner face of the cylinder wall, and which are rounded on their inner side, as indicated at 3, to permit them to seat or fit a groove which is substantially semi-circular in cross-section.

The rings A and B are split, as indicated at 4, to permit the rings to be expanded when they are inserted or removed with relation to the grooves in the piston, and they are otherwise similar in construction to most ordinary forms of piston rings; the only difference being that their inner faces are rounded as shown to permit them to fit a groove substantially semi-circular in shape. The rings shown in Figs. 1 and 2 require a special made piston, that is the grooves in the piston must be turned semi-circular to receive the rings A and B. If it is desired to fit a standard form of piston, such as is provided, with piston grooves substantially rectangular in shape, it becomes necessary to employ a base ring such as shown at C. This ring is shown in Figs. 3 and 4. Its upper and lower surfaces are flat, as at 5 and 6, and its inner face is also flat as at 7. The exterior face however is provided with a semi-circular groove 8 to receive the piston rings A and B as shown, Another form of the ring is shown in Figs. 5 and 6. In this instance a base ring D is also fitted with upper, lower and inner flat surfaces as indicated at 9, 10 and 11, respectively, but the exterior face is grooved in opposite directions as at 12 and 13 to permit the rings A and B to be reversed with relation to each other. This form of ring is desirable when it is desired to spread the rings apart in a vertical direction to maintain snug engagement with the upper and lower walls of the piston groove, and also where it is desired to equip standard pistons in use today. In fact either form of ring shown in Figs. 3 and 5 may be employed in this instance.

In actual practice when employing the simplest form of ring or that illustrated in Figs. 1 and 2, it will be seen that snug engagement is maintained between the rings A and B and the grooves, and also with relation to the inner surface of the cylinder wall when the piston is in operation. For instance if the piston travels in a downward direction, rings A and B, which engage the cylinder wall, will tend to hang back and will thus be crowded upwardly in the piston groove, and as this is semi-circular in cross-section, it will be seen that the drag produced on the rings will tend to force the same upwardly in the groove and at the same time outwardly due to the curved shape of the groove. A snug fit is in this manner obtained both between the rings and the seat or groove in the piston, and a still snugger fit is maintained with relation to the outer surface of the rings and the cylinder proper as the rings do not only engage the cylinder surface, due to the expansive action of the rings themselves, but also due to the fact that they are crowded outwardly to a certain extent on account of the outward movement caused by the shape of the grooves. A similar action will of course take place as far as the ring shown in Figs. 3 and 4 is concerned, but even better engagement may be obtained by the expansive force of the inner base ring C which is split as at 7ª. The type of ring shown in Figs. 5 and 6 is not affected to any great extent by the frictional engagement of the rings A and B with relation to the cylinder wall as they are affected by the expanding action of the inner ring D. This ring presents a wedge-like exterior surface which tends to force the rings A and B outwardly and at the same time upwardly and downwardly against the upper and lower walls 9 and 10 of the piston groove proper.

Having thus described my invention, what I claim and desire to secure by Letters Patent is—

1. A piston ring comprising a pair of split superposed annular rings, said rings presenting a cylindrical exterior surface for engagement with the cylinder wall, and a rounded inner surface to fit a substantially arcuate shaped groove.

2. The combination with a piston having an annular groove formed therein, of a seat member in said groove, a pair of rings carried by said seat member, said rings presenting a cylindrical exterior surface for engagement with the cylinder wall, and a rounded interior surface for engagement with the seat member.

3. A piston ring comprising a split annular expansible base ring, said ring having a substantially semi-circular annular groove formed in its exterior surface, and a pair of superposed rings adapted to seat in said groove, said rings being split and expansible, and said rings presenting a cylindrical exterior surface for engagement with the cylinder wall, and having rounded inner surfaces for engagement with the semi-circular groove.

4. A piston ring comprising a pair of annular expansible split rings, said rings resting one upon the other and presenting a cylindrical annular exterior surface, and said rings presenting an inner curved surface, and a piston for the reception of said rings, said piston having a groove presenting inclined surfaces to force the rings outwardly when subjected to reciprocal movement.

HARRY S. WATERMAN.